(12) United States Patent
Pournasseh et al.

(10) Patent No.: US 7,702,340 B2
(45) Date of Patent: Apr. 20, 2010

(54) SHORT MESSAGE SYSTEM FOR MOBILE DEVICES

(75) Inventors: Houman Pournasseh, Bellevue, WA (US); Brian Murphy, Dublin (IE); Gilles Peigné, Epinay-sur-Orge (FR); Mohamed A. Hassanin, Dubai (AE)

(73) Assignee: Microsoft Corporation, Redmond, WA (US)

( * ) Notice: Subject to any disclaimer, the term of this patent is extended or adjusted under 35 U.S.C. 154(b) by 1872 days.

(21) Appl. No.: 10/751,554

(22) Filed: Jan. 5, 2004

(65) Prior Publication Data

US 2005/0148352 A1    Jul. 7, 2005

(51) Int. Cl.
*H04W 4/00* (2006.01)
(52) U.S. Cl. .................. 455/466; 455/414; 455/416
(58) Field of Classification Search ............ 455/466, 455/414, 416
See application file for complete search history.

(56) References Cited

U.S. PATENT DOCUMENTS 5,920,826 A * 7/1999 Metso et al. ............... 455/557

2003/0050096 A1 * 3/2003 Heatley ..................... 455/560

OTHER PUBLICATIONS

ETSI TS 100 900 v7.2.0 (Jul. 1999) Technical Specification, Digital cellular telecommunications system (Phase 2+); Alphabets and language-specific information (GSM 03.38 version 7.2.0 Release 1998), 20 pages.
Nokia, "Nokia PC Suite 5.1 User Guide," May 29, 2003.

* cited by examiner

*Primary Examiner*—Nick Corsaro
*Assistant Examiner*—Amanuel Lebassi
(74) *Attorney, Agent, or Firm*—Christopher J. Volkmann; Westman, Champlin & Kelly, P.A.

(57) ABSTRACT

A system and apparatus to create text messages and the like on a standard computing device keyboard and the like and then send the messages to destinations via a cell phone has been presented. The text messages are created with a standard keyboard and transmitted via the computing device's wireless port or a wired port to a user's cell phone for sending to the recipient(s) using telephony standards such as Global System for Mobile communications (GSM). The system provides an "off-line" solution where the user does not have to be connected to a network. Interfaces are provided for users to enter the destination number, to select a port from available ports, enter the text, and select options.

32 Claims, 5 Drawing Sheets

SHORT MESSAGE SYSTEM FOR MOBILE DEVICES

FIELD OF THE INVENTION

This invention relates generally to text messaging and, more particularly, relates to short messaging services.

BACKGROUND OF THE INVENTION

With the development and deployment of mobile devices such as laptop computers, personal digital assistant devices, cell phones, etc. and infrastructures, consumers and businesses are increasingly being able to realize the benefits of true mobile computing, collaboration, and information exchange. Hand-in-hand with mobile devices, electronic messaging such as electronic mail ("e-mail") and instant messaging carried over the Internet, is rapidly becoming not only quite pervasive in society but also, given its informality, ease of use and low cost, a preferred method of communication for many individuals and organizations.

More messaging devices and systems are available today than perhaps ever before, providing individuals with numerous ways to communicate and exchange messages with one another. One of the ways to communicate and exchange messages with one another is to send text messages via cell phones and the like. One method of sending text messages with cell phones is through the use of protocols such as short messaging service (SMS).

SMS provides the ability to transmit text messages of up to 160 characters to and from a cell phones. Users type text messages using the keypad of their cell phone. However, there are limitations to the effectiveness and convenience of using the keypad to type messages. For example, the mapping of alphabetical characters to numbers on the keypad make text composition a cumbersome task as the same keypad number may represent several alphabetical characters and/or graphical icons. Additionally, many cell phones provide limited support for international alphabets (e.g., alphabets that are used in countries other than where the phone is sold).

Some members of industry recognized the mapping problem and are developing proprietary solutions. For example, cell phone manufacturers are starting to develop interfaces for their cell phone products to interface with a computer and store and write text messages from the computer. The interfaces that are being developed are limited to the particular manufacturer's cell phones and therefore do not provide a global solution to the keypad issue.

BRIEF SUMMARY OF THE INVENTION

The present invention provides a global solution to creating SMS text messages and the like on a computer keyboard and the like. The text messages are created with a standard keyboard and transmitted via the computer's wireless port or serial port to a user's cell phone for sending to the recipient(s) using telephony standards such as GSM (Global System for Mobile communications).

During operation, the system detects if enhanced applications such as MSN® messenger or Windows® Messenger and the like are running. If the enhanced applications are running, the system asks the user if she would like to use the enhanced services instead of the system. If the user indicates she would like to use the enhanced services, the user is transferred to those services.

The system provides an interface that allows the user to determine and select available ports for transmission of text to the user's cell phone, type the message to be sent, specify the destination phone number, and invoke a phonebook and options. Users may edit individual contact names and import contacts information from the SIM (Security Identity Module) card and the memory of the cellular phone. The options include the type of character encoding and logging all send messages.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
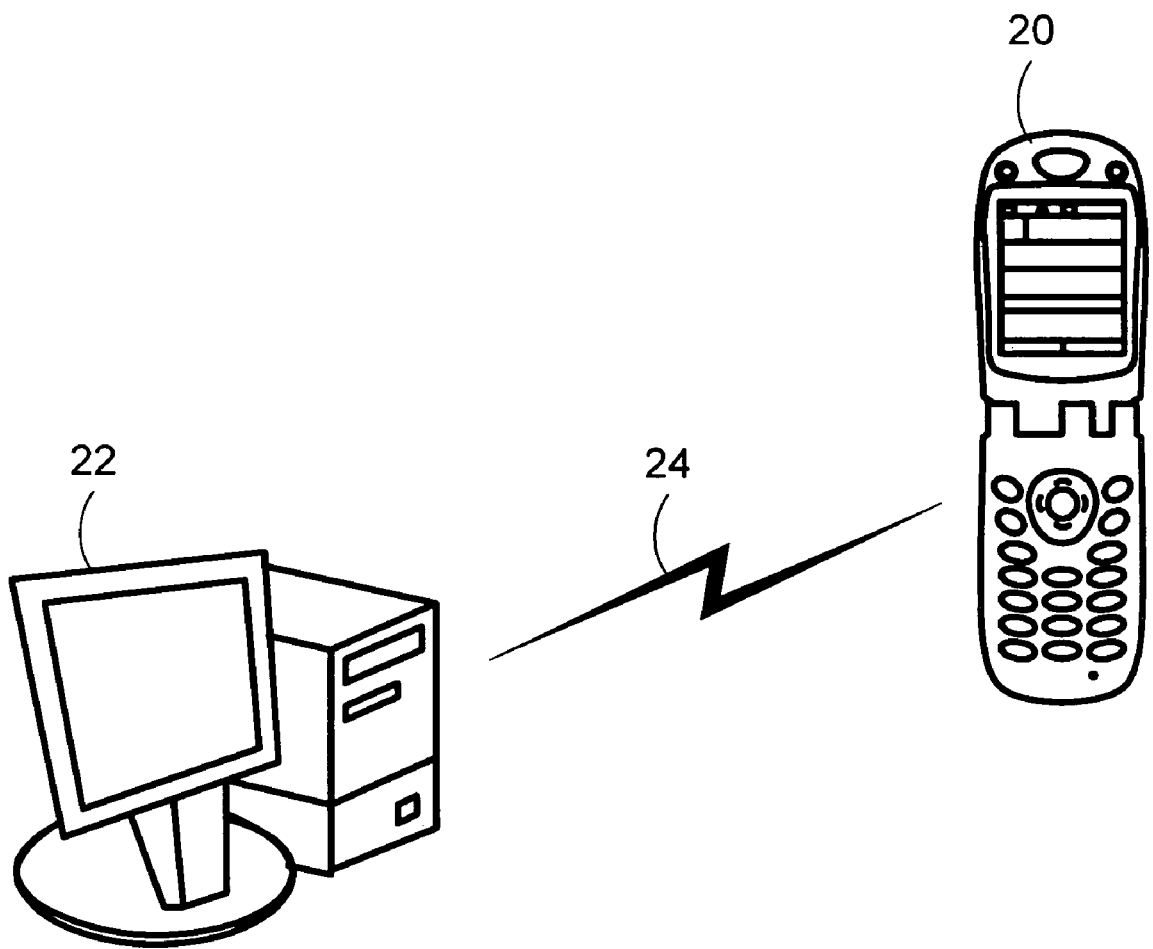
FIG. 1 is a block diagram generally illustrating an exemplary environment in which the present invention operates.

The present invention provides a method and apparatus to create SMS text messages and the like on a keyboard. The text messages created on the keyboard are transmitted via the computer's wireless port or serial port to a user's cell phone for sending to the recipient(s) using telephony standards such as GSM (Global System for Mobile communications).

Turning to the drawings, wherein like reference numerals refer to like elements, the invention is illustrated as being implemented in a suitable environment. A user's cell phone 20 is in communication with computing device 22 via link 24. Computing device 22 may be a desktop computer, a laptop, a PDA, and the like. Link 24 may be a wireless link through a wireless port of the computing device 22 such as an infrared port or the link 24 may be a "wired" port such as a USB port or a serial port.

Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 2:
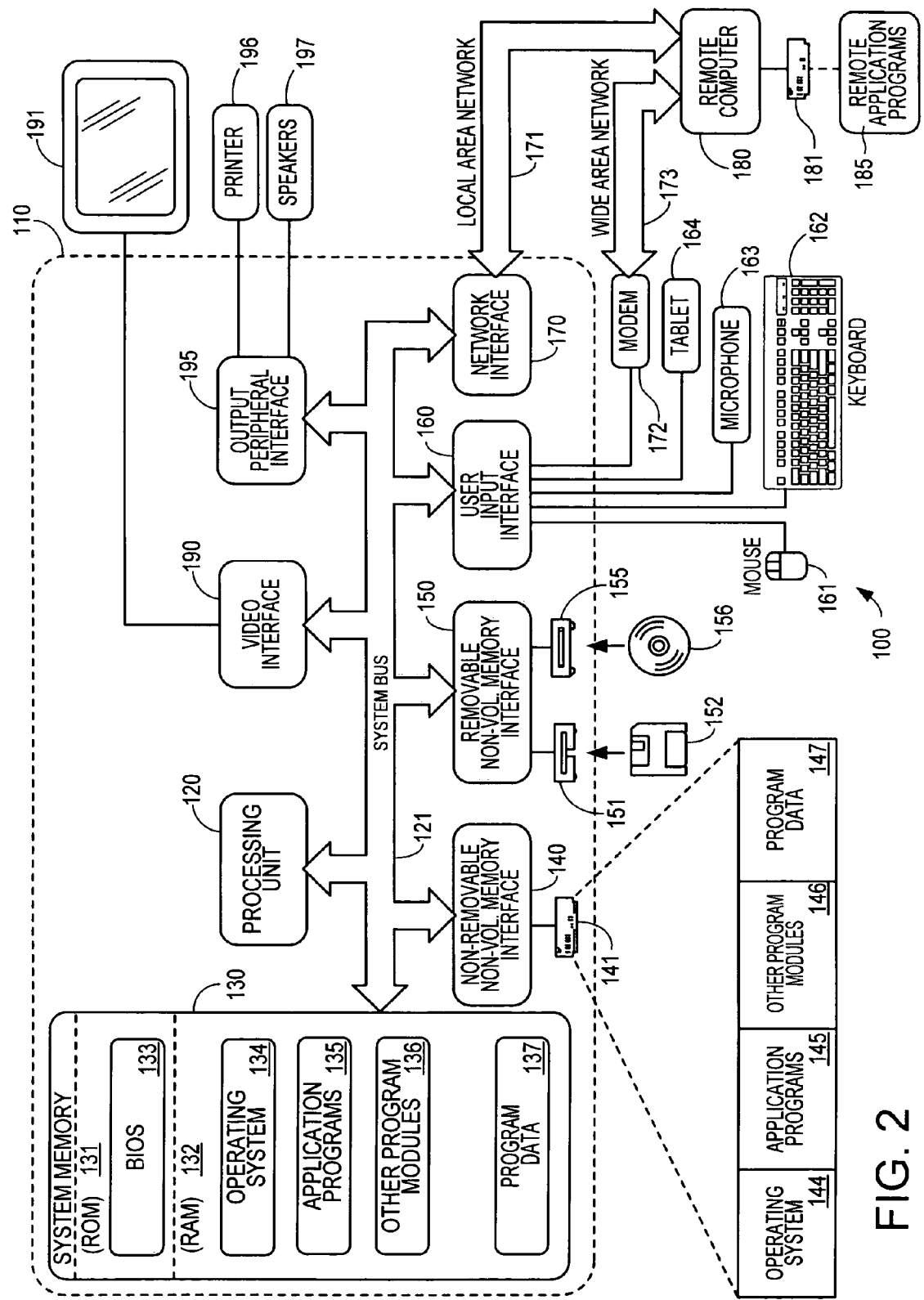
FIG. 2 is a block diagram generally illustrating an exemplary computer system on which the present invention resides.

FIG. 2 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162, a pointing device 161, commonly referred to as a mouse, trackball or touch pad, a microphone 163, and a tablet or electronic digitizer 164. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port, wireless port, or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. It should be noted that the user does not need to be connected to a networked environment for the invention to work. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet. For example, the computer system 110 may comprise the source machine from which data is being migrated, and the remote computer 180 may comprise the destination machine. The source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 3:
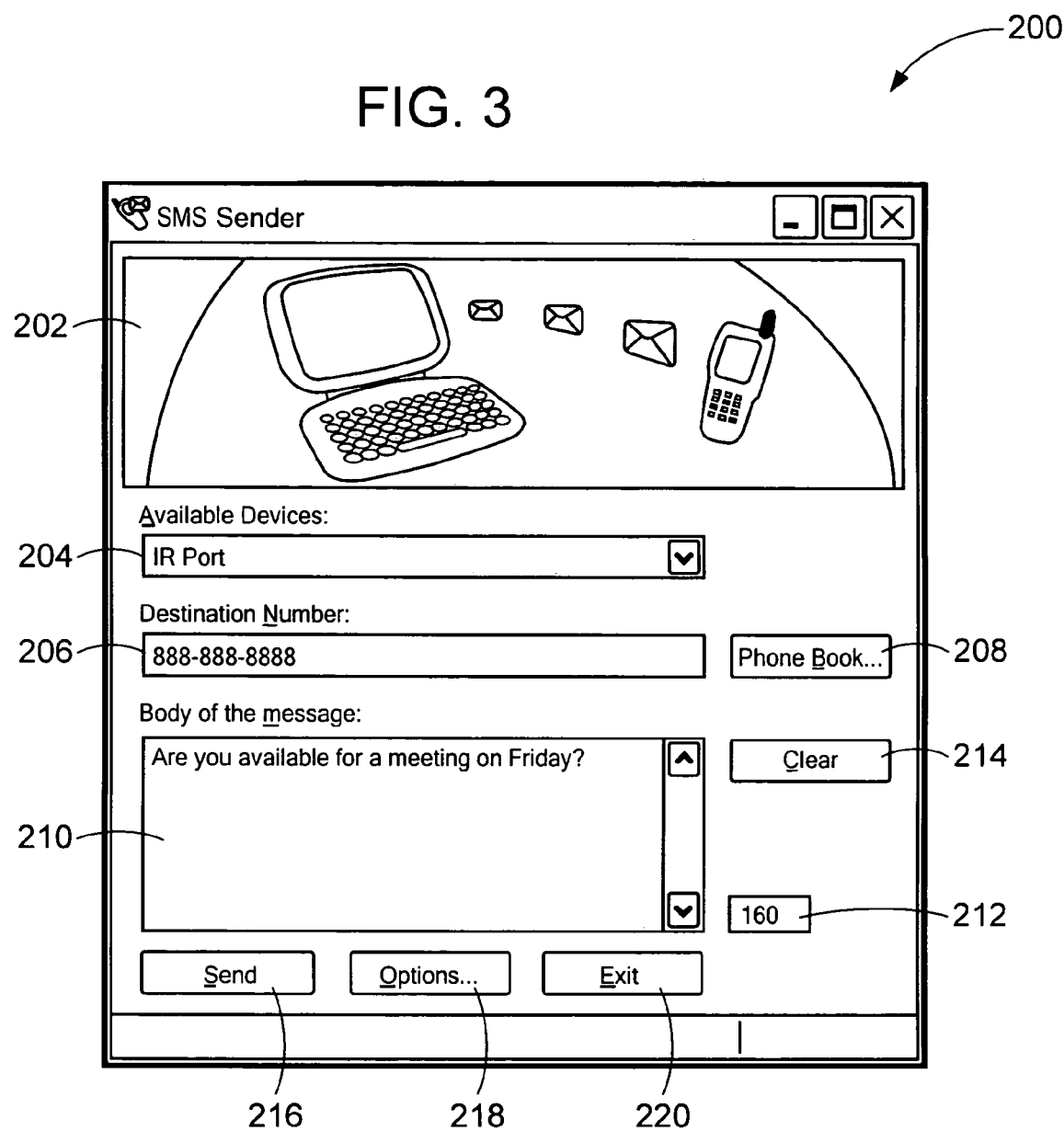
FIG. 3 is a diagram illustrating a user interface in accordance with the teachings of the present invention.

During operation, the user connects his cell phone 20 to the system via an infrared, Blue tooth, or serial port. The method of connection is determined based upon the drivers provided by the cell phone manufacturer. The system may detect when the cell phone is in communication with the system. Turning now to FIG. 3, a graphical user interface 200 is provided by the system. The window has an image area where images can be placed. The window 200 has an available device pull-down menu 204 for the user to select which of the available devices to use. The available device pull-down menu 204 lists the available ports (wireless, Blue tooth, serial, USB, etc.) that the user can select to communicate with the cell phone 20.

The user specifies the destination number of where the message will be sent in field 206. The destination number may be manually entered or the number may be selected from a phone book by pressing button 208. The user types the message to be sent in message field 210. The number of characters in the message field 210 is limited to the number of characters the communication encoding system supports. This number is placed in box 212 to alert the user of the number of characters that are available for each message. For example, GSM standards cannot exceed a maximum of 160 characters. Clicking on the clear button 214 clears the text in message box 210. Once the message has been composed, the user sends the message by clicking on the send button 216. The options button 218 opens up an options interfaces as described below. The program is exited when the exit button 220 is pressed.

Figure 4:
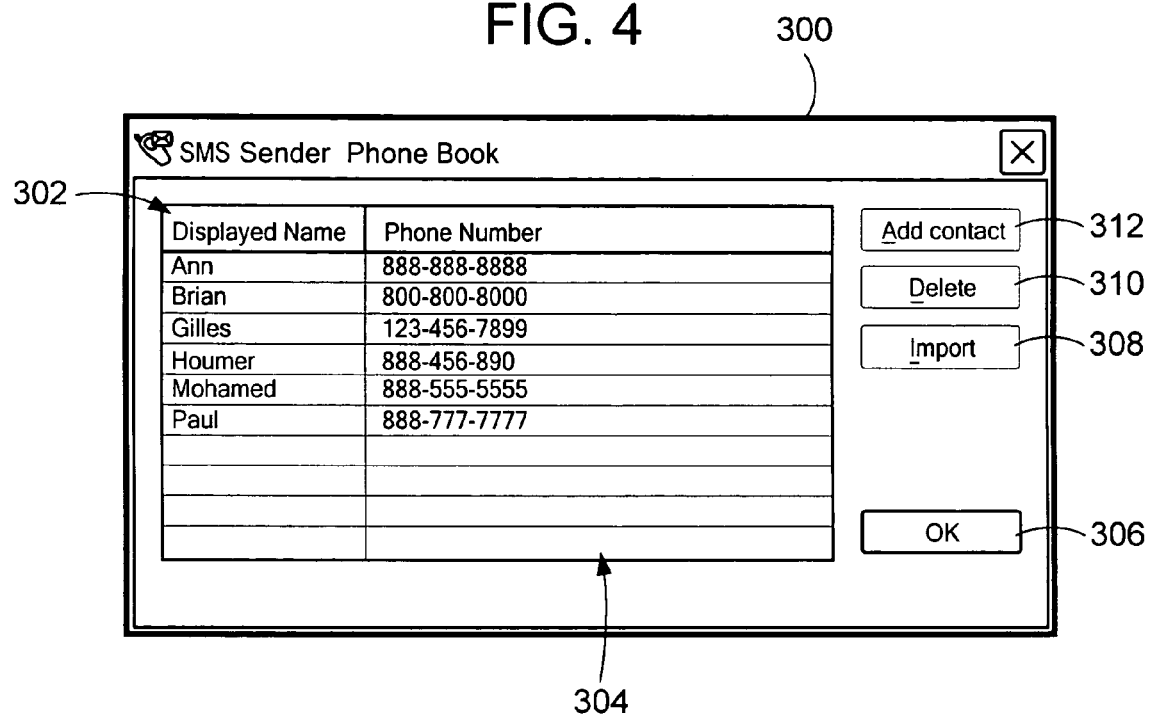
FIG. 4 is a diagram illustrating a phone book interface in accordance with the teachings of the present invention.

Turning now to FIG. 4, the phone book interface window 300 lists the names as entered (or imported) by the user in the displayed name column 302 and the phone number for the names in the phone number column 304. The entries may be sorted by name or by phone number. The user selects the appropriate name and presses the ok button 306 to select the phone number that the system enters into the destination text box 204. Users can import contact information from the SIM card and/or memory of their cell phone by pressing the Import button 308. The system proceeds to import contact information for the user with user input. Contacts can be deleted by highlighting the name to be deleted and pressing the Delete button 310.

Figure 5:
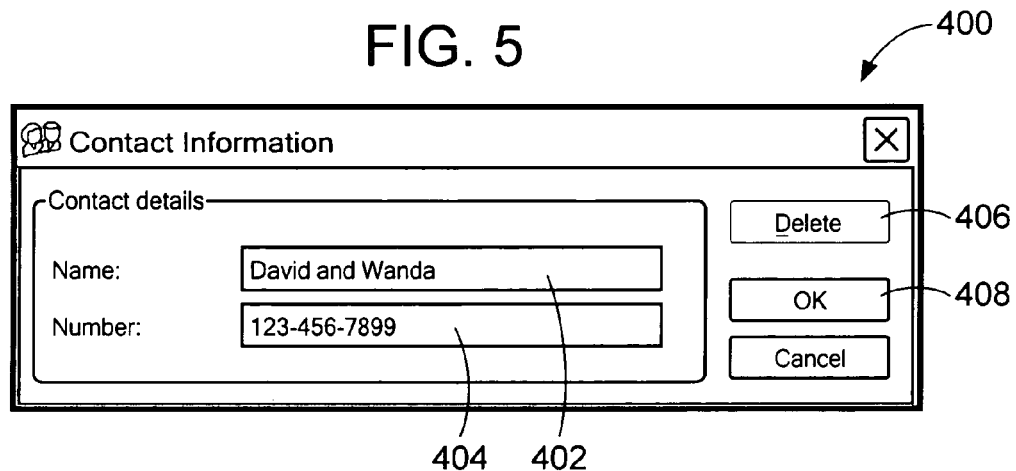
FIG. 5 is a diagram illustrating a contact interface in accordance with the teachings of the present invention.
Figure 6:
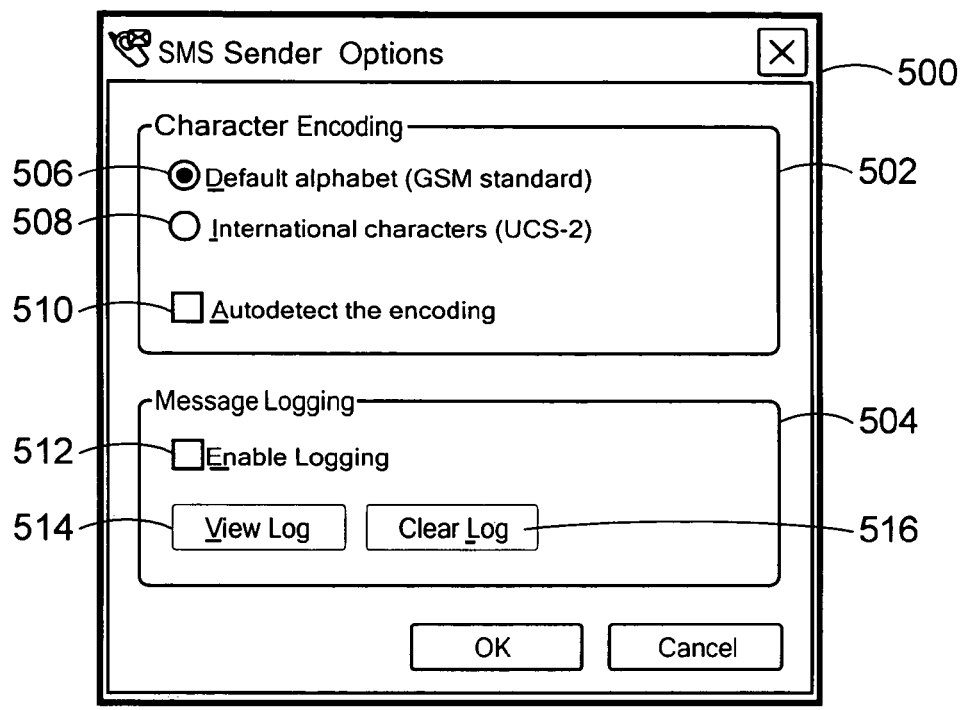
FIG. 6 is a diagram illustrating an options interface in accordance with the teachings of the present invention.

A user can also manually add a contact by pressing the Add contact button 312. The contact information interface 400 (see FIG. 5) is displayed to allow the user to enter information in the name field 402 and number field 404. The user may delete what she has entered by pressing the delete button 406. Pressing the OK button 408 results in the entered information in fields 402, 404 being populated in the corresponding column 302, 304.

Users select options by pressing the Options button 216. An options interface window 500 is displayed after the user selects the button 216. The options interface 500 allows the user to select options. The options shown include the character encoding options 502 and message logging options 504. It is recognized that other options may be shown. The character encoding options 502 allow the user to select the character encoding that can be used. The character encoding in one embodiment can be either based on the GSM standards or UCS-2, which is an international character encoding. The user selects the appropriate radio button 506, 508. Messages encoded with GSM standards cannot exceed a maximum of 160 characters. Messages encoded in UCS-2 cannot exceed a maximum of 70 characters. Users can also choose to let the system select the best encoding for their messages by selecting the Autodetect check button 510.

The message logging options 504 provides the user with the ability to enable message logging by selecting the Enable logging check button 512. When message logging is enabled, all messages are logged for future review. The data logged in one embodiment includes date and time, destination number, and the body of the message. Users can view the message log by pressing the View Log button 514. Users can clear the message log by pressing the Clear Log button 516.

Figure 7:
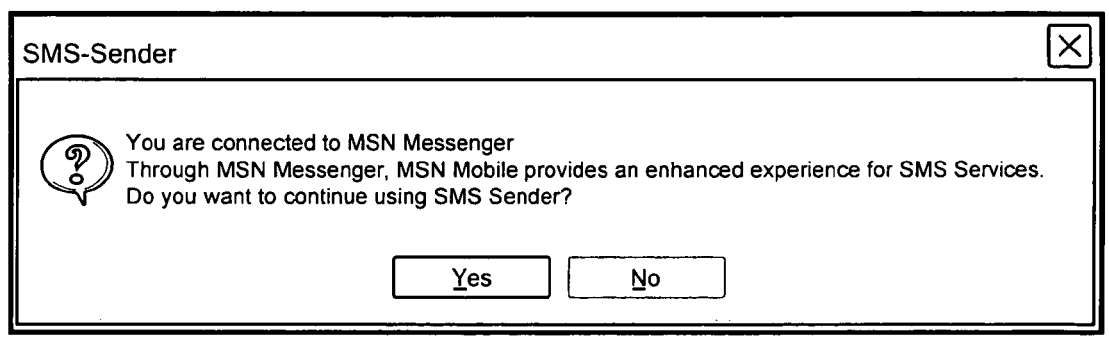
FIG. 7 is a diagram illustrating a notification message in accordance with the teachings of the present invention.

During operation, users might be using a computing device that is logged onto the Internet. In these situations, it is possible that feature enriched communication applications such as MSN® messenger or Windows® Messenger and the like are running. The system asks the user if she would like to continue to use the system if any feature enriched application is running. FIG. 7 illustrates an exemplary notification message that may be used. If the user indicates she does not want to continue to use the system, the user is transferred to those services.

In an alternate embodiment, the message field 212 is not limited to the number of characters the underlying communication protocol supports. The system concatenates the message into several messages with lengths that are less than or equal to the maximum number of characters the underlying communication protocol supports. The messages are sent to the cell phone in consecutive order for the cell phone to send the messages to the recipient.

In an alternate embodiment, users can run the system from a command line of an operating system such as Windows operating systems and the like. This method can typically be used for automating tasks such as scripts on servers. In the Windows operating system, a shell command is used. From a Windows command prompt, go to the system's installation folder (e.g., C:\Program Files\Microsoft SMS Sender) and run the system's executable program (e.g., smssender.exe) with the appropriate options. The system uses the last device with which the user has previously sent messages. This allows the automation of some of the sending phases. The usage of this method using smssender.exe as the name of the executable program is:

```
smssender.exe [[/i] /p:<phone> /m:"<message>" [/u] [/l]] [/?]
where
   /i                indicates that the phone number is expressed in
                     the international format.
   /p:<phone>        is the phone number (numerical values only).
   /m:"<message>"    is the typed message within quotation marks.
   /u                indicates that the message is encoded as UCS-2.
                     By default, the GSM alphabet is used
   /l                commands the system to log the sent message.
   /?                displays the help screen.
```

It can be seen from the foregoing that a system and apparatus to create text messages and the like on a standard computing device keyboard and the like and then send the messages to destinations via a cell phone has been presented. The text messages are created with a standard keyboard and transmitted via the computing device's wireless port or a wired port to a user's cell phone for sending to the recipient(s) using telephony standards such as GSM (Global System for Mobile communications). The system provides an "off-line" solution where the user does not have to be connected to a network.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method to send at least one message to a recipient using a mobile phone and a keyboard of a computing device that is physically separated from the mobile phone, the method comprising:

identifying a number of available ports associated with devices for transmitting data between the computing device and the mobile phone;

generating a list of the available ports;

displaying a user interface on a display device of the computing device, the user interface having a user-selectable control including the list of available ports, a destination number field for entering a destination number for the at least one message, a message field, a send button, and a phone book button, wherein the user-selectable control enables the user to view the number of available ports;

receiving an indication from the user of one port of the list of available ports that is to be used to communicate with the mobile phone, wherein receiving the indication comprises receiving a selection of the one port from the user-selectable control using the computing device;

providing a maximum number indication of a maximum number of characters that can be used in each of the at least one message;

displaying a body of the at least one message in the message field in response to a user typing the at least one message with the keyboard;

displaying a destination number of the recipient in response to one of the user typing the destination number with the keyboard and selecting the destination number from a phone book; and sending the at least one message to the mobile phone via the one port, wherein the at least one message is sent to the recipient using the mobile phone.

2. The method of claim 1 further comprising:

displaying a phone book interface in response to the user selecting the phone book button, the phone book interface comprising a header row having a name header and a phone number header, at least one name row below the header row having a name field for displaying a name provided by the user and a phone number field for displaying a phone number provided by the user, an add contact button, and an ok button.

3. The method of claim 2 further comprising:

in response to a user pressing the ok button if one of the at least one name row has been selected, populating the destination number field with the phone number in the phone number field in the one of the at least one name row.

4. The method of claim 2 wherein the phone book interface further comprises an import button, the method further comprising:

importing contacts information into the at least one name row from the mobile phone in response to the import button being pressed.

5. The method of claim 2 wherein the phone book interface further comprises a delete button, the method further comprising:

in response to a user pressing the delete button if one of the at least one name row has been selected, deleting the name in the name field of the one of the at least one name row that has been selected and deleting the phone number in the phone number field of the one of the at least one name row that has been selected.

6. The method of claim 1 wherein displaying the interface includes displaying an options button.

7. The method of claim 6 further comprising:
displaying an options interface in response to the user selecting the options button, the options interface comprising a character encoding selection area and a message logging selection area, the character encoding selection area having a list of character encodings for the at least one message and a selection box for allowing the user to select auto detection of the best encoding for the at least one message, the message logging selection area having a selection box to enable logging, a view log button to view a message log and a clear log button to clear the message log.

8. The method of claim 7 further comprising:
updating the maximum number indication in response to one of the character encodings in the list of character encodings being selected.

9. The method of claim 7 further comprising:
displaying the message log in response to the view log button being pressed.

10. The method of claim 7 further comprising:
deleting the message log in response to the clear log button being pressed.

11. The method of claim 1 further comprising:
displaying a notification message if a feature enriched communication application is running to determine if the user wants to use the feature enriched communication application.

12. The method of claim 11 further comprising:
transferring control to the feature enriched communication application if the user wants to use the feature enriched communication application.

13. The method of claim 1, wherein generating the list of the available ports comprises generating a drop-down menu control that includes the list of available ports.

14. The method of claim 13, wherein at least one of the available ports comprises a wireless communication channel and at least one of the available ports comprises a wired communication channel.

15. A computer readable medium storing instructions for displaying a graphical user interface for sending a message to a recipient using a mobile phone and a keyboard of a computing device that is physically separated from the mobile phone, the mobile phone having a communication protocol for transmitting the message to the recipient, the graphical user interface comprising:
a window;
a menu field located within the window and having a list of available ports for transmission of the message from the computing device to the mobile phone, wherein a user selects one port from the list of available ports for transmission of the message; a destination number field located within the window and receiving an indication of a destination number associated with the recipient;
a message field located within the window, wherein the message field displays a body of the message in response to a user typing the message with the keyboard;
a maximum number indication field located within the window, wherein the maximum number indication field includes an indication of a maximum number of allowed characters for each message transmitted using the communication protocol of the mobile phone;
wherein the instructions present a send button and a phone book button located within the window; and
wherein the user selects the send button to transmit the body of the message provided in the message field, wherein the computing device concatenates the message into a plurality of message portions based on the maximum number of allowed characters using a processor of the computing device, the plurality of message portions have a consecutive order that is defined based on the body of the message, wherein the computing device transmits each of the plurality of message portions to the mobile device in the consecutive order.

16. The graphical user interface of claim 15 further comprising an options button located within the window.

17. The graphical user interface of claim 15 wherein the menu field comprises a pull-down menu field.

18. The graphical user interface of claim 15 wherein the maximum number of allowed characters is 160 characters.

19. The graphical user interface of claim 15 wherein the maximum number of allowed characters is 70 characters.

20. The graphical interface of claim 15 further comprising an image area within the window.

21. The graphical interface of claim 15 wherein the list of available ports includes one of an infrared port and a Blue tooth port.

22. The graphical interface of claim 21 wherein the one of an infrared port and a Blue tooth port comprises one of the infrared port, the Blue tooth port, and a serial port.

23. At least one computer-readable medium having computer executable instructions for sending at least one message to a recipient using a mobile phone and a keyboard of a computing device, the computing device being physically separated from the mobile phone, the computer executable instructions performing a method comprising:
displaying a user interface having a list of available ports, a destination number field, a message field, a send button, and a phone book button;
receiving an indication of one port of the list of available ports that is to be used to communicate with the mobile phone;
providing a maximum number indication of a maximum number of characters that can be used in each of the at least one message;
displaying a body of the at least one message in response to a user typing the at least one message with the keyboard;
displaying a phone book interface in response to the user selecting the phone book button, the phone book interface comprising a header row having a name header and a phone number header, at least one name row below the header row having a name field for displaying a name provided by the user and a phone number field for displaying a phone number provided by the user, an add contact button, an ok button, and an import button;
receiving a user input indicative of selection of the import button and, in response, importing contacts information from the mobile phone, using the one port, into the at least one name row;
displaying a destination number of the recipient in response to one of the user typing the destination number with the keyboard and selecting the destination number from a phone book; and
sending the at least one message to the mobile phone via the one port.

24. The at least one computer readable medium of claim 23, wherein the method further comprises:
in response to a user pressing the ok button if one of the at least one name row has been selected, populating the destination number field with the phone number in the phone number field in the one of the at least one name row.

25. The at least one computer readable medium of claim 23 wherein the phone book interface further comprises a delete button, wherein the method further comprises:
   in response to a user pressing the delete button if one of the at least one name row has been selected, deleting the name in the name field of the one of the at least one name row that has been selected and deleting the phone number in the phone number field of the one of the at least one name row that has been selected.

26. The at least one computer readable medium of claim 23 wherein displaying the interface includes the step of displaying an options button.

27. The at least one computer readable medium of claim 26, wherein the method further comprises:
   updating the maximum number indication in response to one of the character encodings in the list of character encodings being selected.

28. The at least one computer readable medium of claim 26, wherein the method further comprises:
   displaying the message log in response to the view log button being pressed.

29. The at least one computer readable medium of claim 26, wherein the method further comprises:
   deleting the message log in response to the clear log button being pressed.

30. The at least one computer readable medium of claim 26, wherein the method further comprises:
   displaying an options interface in response to the user selecting the options button, the options interface comprising a character encoding selection area and a message logging selection area, the character encoding selection area having a list of character encodings for the at least one message and a selection box for allowing the user to select auto detection of the best encoding for the at least one message, the message logging selection area having a selection box to enable logging, a view log button to view a message log and a clear log button to clear the message log.

31. The at least one computer readable medium of claim 23, wherein the method further comprises:
   displaying a notification message if a feature enriched communication application is running to determine if the user wants to use the feature enriched communication application.

32. The at least one computer readable medium of claim 31, wherein the method further comprises:
   transferring control to the feature enriched communication application if the user wants to use the feature enriched communication application.

* * * * *